(12) United States Patent
Hillard et al.

(10) Patent No.: US 11,004,010 B2
(45) Date of Patent: May 11, 2021

(54) PROCESSING REAL-TIME PROCESSING REQUESTS USING MACHINE LEARNING MODELS

(71) Applicants: Dustin Lundring Rigg Hillard, Seattle, WA (US); Alex Balikov, Seattle, WA (US); Micah Kornfield, Seattle, WA (US); Scott Golder, Seattle, WA (US)

(72) Inventors: Dustin Lundring Rigg Hillard, Seattle, WA (US); Alex Balikov, Seattle, WA (US); Micah Kornfield, Seattle, WA (US); Scott Golder, Seattle, WA (US)

(73) Assignee: eSentire, Inc., Cambridge (CA)

( * ) Notice: Subject to any disclaimer, the term of this patent is extended or adjusted under 35 U.S.C. 154(b) by 808 days.

(21) Appl. No.: 15/395,630

(22) Filed: Dec. 30, 2016

(65) Prior Publication Data
US 2018/0189674 A1 Jul. 5, 2018

(51) Int. Cl.
*G06N 20/00* (2019.01)
*G06Q 40/08* (2012.01)
*G06Q 40/04* (2012.01)
*G06F 9/50* (2006.01)

(52) U.S. Cl.
CPC .......... *G06N 20/00* (2019.01); *G06F 9/5027* (2013.01); *G06Q 40/04* (2013.01); *G06Q 40/08* (2013.01)

(58) Field of Classification Search
CPC ...... G06N 20/00; G06F 9/5027; G06Q 40/04; G06Q 40/08
USPC .......................................................... 706/12
See application file for complete search history.

(56) References Cited

U.S. PATENT DOCUMENTS

| 8,112,755 B2 * | 2/2012 | Apacible | G06N 20/00 718/104 |
| 8,200,610 B1 * | 6/2012 | Birch | G06N 20/00 706/62 |
| 8,521,664 B1 | 8/2013 | Wei-Hao et al. | |

(Continued)

OTHER PUBLICATIONS

Crankshaw et al., "Clipper: A Low-Latency Online Prediction Serving System" Dec. 9, 2016, pp. 1-14. (Year: 2016).*

(Continued)

*Primary Examiner* — Vincent Gonzales
*Assistant Examiner* — Chase P. Hinckley
(74) *Attorney, Agent, or Firm* — Fish & Richardson P.C.

(57) ABSTRACT

Methods, systems, and apparatus, including computer programs encoded on computer storage media, for providing consistent processing in a machine learning system are disclosed. A real-time processing request may be received and processed by both a preferred machine learning model and a fallback machine learning model. Processing for the preferred machine learning model may include obtaining additional information. A determination may be made regarding whether the processing of the real-time request by the preferred machine learning model has completed as of an expiration of an acceptable latency period. If the preferred model has not completed as of the expiration of an acceptable latency period, the response to the real-time request may be generated from the fallback model output. If the preferred model has completed prior to or by the expiration of the acceptable latency period, the response to the request may be generated from the preferred model output.

14 Claims, 3 Drawing Sheets

(56) References Cited

U.S. PATENT DOCUMENTS

| | | | | |
|---|---|---|---|---|
| 8,635,133 | B2* | 1/2014 | Freer | G06Q 40/04 705/35 |
| 8,930,525 | B2* | 1/2015 | Haeuptle | G06F 11/3419 709/224 |
| 9,280,791 | B2* | 3/2016 | Rooney | G06Q 40/04 |
| 9,641,399 | B1* | 5/2017 | Makrucki | H04L 41/22 |
| 9,898,741 | B2* | 2/2018 | Siegel | G06Q 20/4016 |
| 10,037,568 | B2* | 7/2018 | Taylor | G06Q 40/04 |
| 10,389,738 | B2* | 8/2019 | Muddu | G06F 16/254 |
| 10,628,826 | B2* | 4/2020 | Yu | G06Q 20/40 |
| 2005/0015323 | A1* | 1/2005 | Myr | G06Q 40/04 705/37 |
| 2005/0137961 | A1* | 6/2005 | Brann | G06Q 40/04 705/37 |
| 2008/0267069 | A1* | 10/2008 | Thielman | H04N 7/142 370/235 |
| 2011/0040701 | A1* | 2/2011 | Singla | G06Q 40/06 705/36 R |
| 2011/0066551 | A1* | 3/2011 | Bruesewitz | G06Q 20/04 705/44 |
| 2011/0295736 | A1* | 12/2011 | Freer | G06Q 40/04 705/37 |
| 2012/0005749 | A1* | 1/2012 | Zoldi | G06Q 40/00 726/22 |
| 2012/0166327 | A1* | 6/2012 | Amicangioli | G06Q 40/04 705/37 |
| 2013/0282549 | A1* | 10/2013 | Howorka | G06Q 40/04 705/37 |
| 2013/0297478 | A1* | 11/2013 | Mannix | G06Q 40/04 705/37 |
| 2014/0032306 | A1* | 1/2014 | Sukornyk | G06Q 30/0269 705/14.43 |
| 2014/0149273 | A1* | 5/2014 | Angell | G06Q 40/04 705/37 |
| 2014/0214647 | A1* | 7/2014 | Simonoff | G06Q 40/04 705/37 |
| 2014/0249979 | A1* | 9/2014 | Wallener | G06Q 40/04 705/37 |
| 2014/0310026 | A1* | 10/2014 | Balthazar | G06Q 40/08 705/4 |
| 2014/0358757 | A1* | 12/2014 | Bartko | G06Q 40/00 705/37 |
| 2014/0359036 | A1* | 12/2014 | Blakers | H04L 51/26 709/206 |
| 2015/0026061 | A1* | 1/2015 | Siegel | G06Q 20/4016 705/44 |
| 2015/0073967 | A1* | 3/2015 | Katsuyama | G06Q 30/08 705/37 |
| 2015/0081324 | A1* | 3/2015 | Adjaoute | G06Q 30/0185 705/2 |
| 2015/0088726 | A1* | 3/2015 | Aisen | H04L 67/325 705/37 |
| 2015/0088783 | A1* | 3/2015 | Mun | G06Q 40/06 705/36 R |
| 2015/0127516 | A1* | 5/2015 | Studnitzer | G06Q 40/06 705/37 |
| 2015/0127519 | A1* | 5/2015 | Melton | G06Q 40/04 705/37 |
| 2015/0134462 | A1* | 5/2015 | Jalali | G06Q 30/0275 705/14.71 |
| 2015/0332398 | A1* | 11/2015 | Brkic | G06Q 40/04 705/37 |
| 2015/0339673 | A1* | 11/2015 | Adjaoute | G06F 16/283 705/30 |
| 2015/0356679 | A1* | 12/2015 | Schmitt | G06Q 40/04 705/37 |
| 2016/0012544 | A1* | 1/2016 | Ramaswamy | G06Q 40/08 705/4 |
| 2016/0078537 | A1* | 3/2016 | Katsuyama | G06Q 40/08 705/37 |
| 2016/0078538 | A1* | 3/2016 | Katsuyama | G06Q 40/04 705/37 |
| 2016/0104242 | A1* | 4/2016 | Melton | G06Q 40/04 705/37 |
| 2016/0140661 | A1* | 5/2016 | Rooney | G06Q 40/04 705/37 |
| 2016/0155157 | A1* | 6/2016 | Butler | G06Q 30/0275 705/14.71 |
| 2016/0196606 | A1* | 7/2016 | Damodaran | G06Q 40/06 705/37 |
| 2016/0260114 | A1* | 9/2016 | Bendel | G06Q 40/06 |
| 2016/0275570 | A1* | 9/2016 | Seljan | G06Q 30/0275 |
| 2016/0300156 | A1* | 10/2016 | Bowers | G06F 16/2465 |
| 2016/0314527 | A1* | 10/2016 | Rosenberg | G06Q 30/08 |
| 2016/0328798 | A1* | 11/2016 | Thakkar | G06Q 40/06 |
| 2016/0364437 | A1* | 12/2016 | Djurdjevic | G06Q 40/04 |
| 2017/0026441 | A1* | 1/2017 | Moudy | G06F 9/5027 |
| 2017/0032462 | A1* | 2/2017 | Perrett | G06Q 30/0201 |
| 2017/0046783 | A1* | 2/2017 | Hosman | G06Q 40/04 |
| 2017/0098236 | A1* | 4/2017 | Lee | G06Q 30/0244 |
| 2017/0148027 | A1* | 5/2017 | Yu | G06Q 20/4016 |
| 2017/0186049 | A1* | 6/2017 | Jeong | G06Q 30/0275 |
| 2017/0236073 | A1* | 8/2017 | Borisyuk | G06N 20/00 706/12 |
| 2017/0286864 | A1* | 10/2017 | Fiedel | G06F 9/546 |
| 2017/0330245 | A1* | 11/2017 | Guermas | G06Q 30/0275 |
| 2017/0358011 | A1* | 12/2017 | Guermas | G06Q 30/0275 |
| 2018/0046939 | A1* | 2/2018 | Meron | G06N 20/00 |
| 2018/0083901 | A1* | 3/2018 | McGregor, Jr. | H04L 51/10 |
| 2018/0157539 | A1* | 6/2018 | Agarwal | G06F 9/5088 |
| 2019/0259099 | A1* | 8/2019 | Katsuyama | G06Q 40/04 |
| 2020/0090278 | A1* | 3/2020 | Christensen | G06N 20/00 |

OTHER PUBLICATIONS

Crankshaw et al., "The Missing Piece in Complex Analytics: Low Latency, Scalabel Model Management and Serving with Velox" Dec. 1, 2014, 7th Biennial Conference on Innovative Data Systems Research. (Year: 2014).*

Ahmad et al., "Real-Time Anomaly Detection for Streaming Analytics" Jul. 8, 2016. (Year: 2016).*

Heinze et al., "Latency-aware Elastic Scaling for Distributed Data Stream Processing Systems" 2014, pp. 13-22. (Year: 2014).*

Kumbhare, Alok Gautam, "Adaptive and Resilient Stream Processing on Cloud Infrastructure" May 2016, Doctoral dissertation, University of Southern California, pp. i-174. (Year: 2016).*

Hasbrouck et al., "Low-latency trading" May 22, 2013, Journal of Financial Markets, No. 16, pp. 646-679. (Year: 2013).*

West et al., "Intelligent financial fraud detection: A comprehensive review" Nov. 12, 2015, Computer and Security, No. 57, pp. 47-66. (Year: 2015).*

Pagolu et al., "Sentiment Analysis of Twitter Data for Predicting Stock Market Movements" Oct. 28, 2016. (Year: 2016).*

Shariat et al., "Online evaluation of bid prediction models in a large-scale computational advertising platform: decision making and insights" Jul. 27, 2016, pp. 1-60. (Year: 2016).*

Shariat et al., "Online Model Evaluation in a Large-Scale Computational Advertising Platform" Aug. 31, 2015. (Year: 2015).*

Li et al., "Work Stealing for Interactive Services to Meet Target Latency" Mar. 12-16, 2016. (Year: 2016).*

Shen et al., "From 0.5 Million to 2.5 Million: Efficiently Scaling up Real-Time Bidding" 2015, IEEE, pp. 973-978. (Year: 2015).*

Fernandez-Tapia et al., "Optimal Real-Time Bidding Strategies" Jun. 17, 2016, pp. 1-37. (Year: 2016).*

Han et al., "MCDNN: An Approximation-Based Framework for Deep Stream Processing Under Resource Constraints" Jun. 25-30, 2016, pp. 123-136. (Year: 2016).*

Bian et al., "Financial Fraud Detection: A New Ensemble Learning Approach for Imbalanced Data" Jun. 27, 2016. (Year: 2016).*

Khaidem et al., "Predicting the direction of stock market prices using random forest" Apr. 29, 2016, pp. 1-20. (Year: 2016).*

Lohrmann et al., "Elastic Stream Processing with Latency Guarantees" 2015, IEEE, pp. 399-410. (Year: 2015).*

Wang et al., "Display Advertising with Real-Time Bidding (RTB) and Behavioural Targeting" Oct. 11, 2016, pp. i-119. (Year: 2016).*

(56) References Cited

OTHER PUBLICATIONS

West et al., "Some Experimental Issues in Financial Fraud Detection: An Investigation" 2015, IEEE, pp. 1155-1158. (Year: 2015).*
Yan et al., "SERF: Efficient Scheduling for Fast Deep Neural Network Serving via Judicious Parallelism" 2016, IEEE, pp. 300-311. (Year: 2016).*
Zhang et al., "In-Memory Big Data Management and Processing: A Survey" Jul. 2015, IEEE, pp. 1920-1948. (Year: 2015).*
Zhang et al., "Optimal Real-Time Bidding for Display Advertising" Jun. 6, 2016, pp. 1-189. (Year: 2016).*
Haas et al., "CLAMShell: Speeding up Crowds for Low-latency Data Labeling" Sep. 20, 2015. (Year: 2015).*
Zhou et al., "On Convergence of Model Parallel Proximal Gradient Algorithm for Stale Synchronous Parallel System" May 2, 2016, pp. 713-722. (Year: 2016).*
Lohrmann, Bjorn, "Massively Parallel Stream Processing with Latency Guarantees" 2016. (Year: 2016).*
Jia, Hengjian, "Investigation into the effectiveness of Long Short Term Memory Networks for Stock Price Prediction" Aug. 28, 2016, pp. 1-6. (Year: 2016).*
Agarwal et al., "A Multiworld Testing Decision Service" Jun. 13, 2016, pp. 1-15. (Year: 2016).*
Manimaran et al., "A new scheduling approach supporting different fault-tolerant techniques for real-time multiprocessor systems," Microprocessors and Microsystems, Dec. 15, 1997, 21(3):163-173.
PCT International Preliminary Report on Patentability in International Application No. PCT/US2017/069127, dated Jul. 2, 2019, 9 pages.
PCT International Search Report and Written Opinion in International Application No. PCT/US2017/069127, dated Jun. 15, 2018, 12 pages.

\* cited by examiner

PROCESSING REAL-TIME PROCESSING REQUESTS USING MACHINE LEARNING MODELS

BACKGROUND

Machine learning models receive input and generate output based on the received input and on values of model parameters. While batch processing and non-real time streaming processing can tolerate latency fluctuations due to transient hardware and/or software events, a real-time system has hard latency constraints that make latency fluctuations intolerable.

SUMMARY

This specification describes technologies relating to machine learning systems in general, and specifically to methods and systems for providing consistent processing in a real-time processing machine learning system.

In general, one aspect of the subject matter described in this specification can be embodied in a system comprising one or more computers and one or more storage devices storing instructions that are operable, when executed by the one or more computers to cause the one or more computers to perform operations that implement an example method. An example method comprises: receiving a first real-time processing request; processing the first real-time processing request by a fallback machine learning model to generate a fallback model output; initializing processing of the first real-time processing request by a preferred machine learning model; determining that the processing of the first real-time processing request by the preferred machine learning model has not been completed as of an expiration of an acceptable latency period from a time at which the first real-time processing request was received; and in response to determining that the processing of the first real-time processing request by the preferred machine learning model has not been completed: generating first response data from the fallback model output; and providing the first response data as a response to the first real-time processing request.

These and other embodiments can optionally include one or more of the following features. A second real-time processing request for a machine learning model output may be received and the processing of the second real-time processing request may be initialized by the preferred machine learning model. The second real-time processing request may be processed by the fallback machine learning model to generate a fallback model output for the second real-time processing request. The processing of the second real-time processing request by the preferred machine learning model may be determined to be completed to generate a preferred model output for the second real-time processing request prior to an expiration of the acceptable latency period from a time at which the second real-time processing request was received. In response to determining that the processing of the second real-time processing request by the preferred model has completed, second response data may be generated from the preferred model output and provided to as a response to the second real-time processing request.

In some implementations, processing the first real-time processing request using the preferred machine learning model comprises: identifying, from the first real-time processing request, additional information to be provided as input to the preferred machine learning model; obtaining the additional information for the first real-time processing request by making at least one network call; and generating a preferred model input for the preferred machine learning model from the additional information and the first real-time processing request.

In some implementations, processing the first real-time processing request using the fallback machine learning model comprises: approximating the additional information for the first real-time processing request; generating a fallback model input from the approximation of the additional information and the first real-time processing request; and processing the fallback model input using the fallback machine learning model to generate the fallback output. An acceptable latency period may be predetermined prior to processing the first real-time processing request. An acceptable latency period may be configurable.

In some implementations the real-time request may be a request to predict a next transaction price or a next transaction price direction for one or more financial products. The preferred model may then process the real-time request with additional information acquired about recent transaction prices and the fallback model may process the real-time request with an approximation of the additional information about the recent transaction prices. The financial products may comprise one or more common stock shares, exchange traded fund shares, options contracts, commodity futures contracts, or financial derivatives.

In some implementations, the real-time request may be a request to predict whether a particular transaction is anomalous or fraudulent. The preferred model may then process the real-time request with additional information acquired about recent transactions and the fallback model processes the real-time request with an approximation of the additional information about recent transactions. The particular transaction may be a completed credit card or debit card transaction and the additional information may include information regarding recent completed credit card or debit card transactions. The particular transaction may be a financial claims processing transaction and the additional information may include information regarding recent financial claims processing transactions. The particular transaction may be an insurance claims transaction, a healthcare claims transaction, or an employee expense claims transaction, and the additional information may include information regarding recent claims transactions.

In some implementations, the real-time request may be a request to predict security threats or anomalous behavior for one or more users or machines on a network. The preferred model may process the real-time request with additional information acquired about user or machine behavior and the fallback model may process the real-time request with an approximation of the additional information about the user or machine behavior.

Particular embodiments of the subject matter described in this specification can be implemented so as to realize one or more of the following advantages. Conventional systems may have latency fluctuations that make the systems unable to process real-time processing requests within an acceptable latency period. These systems may therefore provide responses to real-time processing requests that may include time-outs or errors instead of actual predictions or acceptable responses to the requests. An advantage of the techniques and systems described in this specification is that acceptable responses to the real-time processing requests are provided even when latency fluctuations cause a preferred machine learning model to be unable to finish processing within an acceptable latency period. A fallback model ensures that a response with a satisfactory minimum level of quality can be provided to effectively respond to the real-time processing request within the acceptable latency period.

The details of one or more embodiments of the invention are set forth in the accompanying drawings which are given by way of illustration only, and the description below. Other features, aspects, and advantages of the invention will become apparent from the description, the drawings, and the claims.

DETAILED DESCRIPTION

Figure 1:
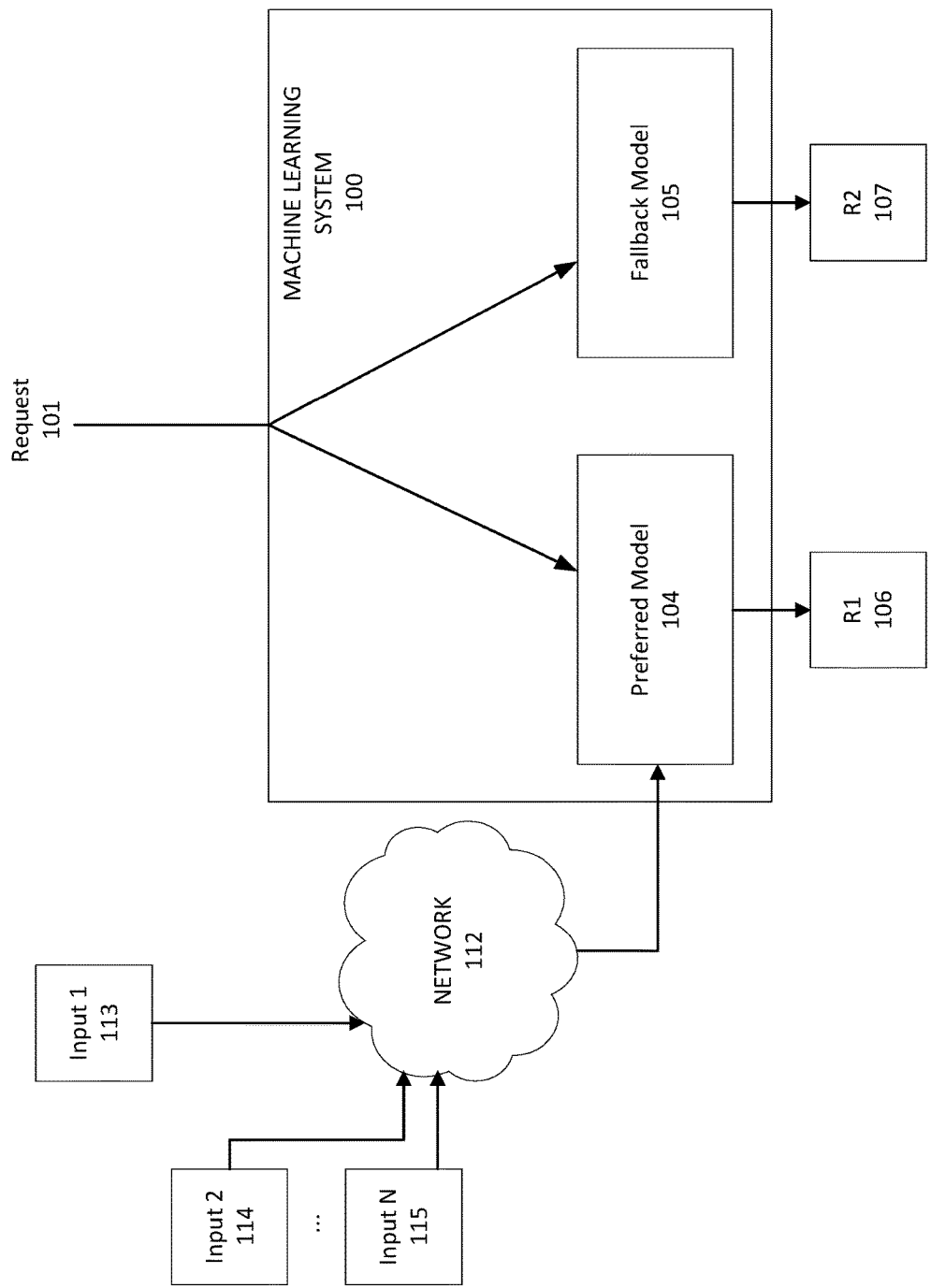
FIG. 1 shows a machine learning system for providing consistent processing of real-time requests.

This specification generally describes a machine learning system that provides consistent processing for real-time processing requests which require responses in real-time. These requests require responses before the expiration of an acceptable latency period, which is an elapsed time from the time at which a request was received to a time at which the response is available. Generally, the machine learning system generates responses to received requests based on the output of a machine learning model.

To ensure that responses are generated within an acceptable latency period while still satisfying a minimum level of quality, the machine learning system maintains two machine learning models: a preferred machine learning model and a fallback machine learning model. In the example system, a response is generated using data identifying the output generated by one of the models.

Each machine learning model is a predictive model that receives an input, e.g., a feature vector, and predicts an outcome based on the received input and on values of the parameters of the model. Generally, both the preferred machine learning model and the fallback machine learning model have been trained to generate the same kind of model output, i.e., to perform the same machine learning task. However, although outputs generated by the fallback machine learning model satisfy the minimum level of quality, the preferred machine learning model generally generates higher-quality model outputs than those generated by the fallback machine learning model. That is, for a given received request, the prediction represented by the model output generated by the preferred machine learning model will tend to be more accurate than the prediction generated by the fallback machine learning model. On the other hand, the processing time required for the preferred machine learning model to generate an output will generally be unpredictable, while the fallback machine learning model can reliably generate an output before the expiration of the acceptable latency period.

Thus, when the machine learning system receives a real-time processing request, the system processes the request using the fallback machine learning model to generate a fallback output for the request. The example system also initiates processing of the request using the preferred machine learning model. If the processing of the request by the preferred machine learning model is completed before the expiration of the acceptable latency period, the example system generates a response based on the output of the preferred machine learning model and provides the preferred response in response to the request. If the processing of the request by the preferred machine learning model has not been completed as of the expiration of the acceptable latency period, the system generates a response based on the output of the fallback machine learning model and provides the fallback response in response to the request.

The machine learning model system may be used in any of a variety of contexts that rely on consistent processing of requests by a machine learning model.

For example, the preferred and fallback machine learning models can be used to generate financial product trade price or direction predictions, i.e., by predicting the next trade price of a particular financial product, or by predicting whether the next trade of a particular product is likely to be at a higher price, or at a lower price, than the most recent trade.

As another example, the preferred and fallback machine learning models can be used to generate fraud or anomaly predictions for credit card or debit card transactions, i.e., predicting the likelihood that a particular transaction is fraudulent or otherwise anomalous.

As another example, the preferred and fallback machine learning models can be used to generate fraud or anomaly predictions for any type of financial claims processing, i.e., predicting the likelihood that a particular insurance claim, or health care claim, or employee expense claim, is fraudulent or otherwise anomalous and worthy of further inspection.

As another example, the preferred and fallback machine learning models can be used to generate expected values for financial transaction data for any type of purchase decision making, i.e., predicting what the expected value would be for a healthcare claim for a particular procedure in a certain city, or the expected price of airfare between two cities on a particular date, or the expected price of a hotel room in a particular city on a particular date. These expected values could then further be used in fraud or anomaly detection or prediction, i.e., if a financial transaction or claim was for an amount sufficiently different than the predicted value, it may be potentially considered fraudulent or anomalous.

As another example, the preferred and fallback machine learning models can be used to generate likelihoods of user activities or behaviors. For example, the preferred and fallback machine learning models may predict the likelihood that a user would click on a particular button on a web page, or purchase a particular product, or click on a particular advertisement or advertising link. A predictive modeling system may also be able to predict the likelihood that a user travels to a particular location, acts in a particular way, participate in a particular activity, or associates with a particular individual.

As another example, the preferred and fallback machine learning models can be used for security and general anomaly detection. That is, the preferred and fallback machine learning models may predict the likelihood that certain behavior or certain metric values characterizing entity behavior on a network are anomalous, i.e., pose a potential security risk. For example, the preferred and fallback machine learning models may predict the likelihood that a user or machine would transfer a certain amount of data from one location to another, or make an authorization or application request.

In any of the above predictive scenarios, it is important for the machine learning system to provide a predictive answer to a request for information and, more specifically, to provide the predictive answer within the acceptable latency period of receiving the request.

FIG. 1 shows an example machine learning system 100 that maintains a preferred machine learning model 104 and a fallback machine learning model 105. The machine learning system 100 is an example of a system implemented as computer programs on one or more computers in one or more locations in which the systems, components, and techniques described below are implemented.

In operation, the machine learning system 100 receives real-time processing requests from users of the machine learning system 100 and responds to each received request by providing a response that is based on a model output generated by either the preferred machine learning model 104 or the fallback machine learning model 105. Each request specifies the input data available to the requestor at the time the request is submitted. For a credit card system, the request specifies information such as the credit card number, the customer identification number, the merchant identification number, and other metadata. In some cases, as described below, the preferred model, the fallback model, or both may require additional data for processing the request.

For example, the machine learning system 100 receives a request 101 and responds to the request by either generating a response 106 based on a preferred model output generated by the preferred machine learning model 104 or generating a response 107 based on a fallback model output generated by the fallback machine learning model 105.

Generally, the real-time processing requests received by the machine learning system 100 are requests for a specific kind of prediction data that is generated based on data identified in or defined by the request. Both of the models 104 and 105 have been trained to perform the same machine learning task, i.e., to generate outputs that represent predictions of the kind that are requested from the machine learning system 100.

As discussed above, a prediction generated by the preferred machine learning model 104 tends to be more accurate and of higher-quality than a prediction generated by the fallback machine learning model 105. However, the preferred machine learning model 104 has an unpredictable processing time, i.e., sometimes the preferred machine learning model 104 takes longer than the acceptable latency period to process outputs.

The preferred machine learning model 105 may have an unpredictable processing time for any of a variety of reasons. In some implementations, the processing time of the preferred machine learning model 105 is unpredictable at least in part because the preferred machine learning model 105 requires additional information as input beyond the information provided in the request in order to make a prediction. This information can include data provided by remote network calls, or extremely complex or unpredictable data transformations.

For example, the preferred machine learning model 104 receives a request 101 to provide real-time output results in the form of predictions 106 regarding whether a person's credit card transaction is fraudulent based on the person's real-time credit card transaction history using credit card transaction data from the last few minutes, or in financial trading, based on trades that occurred in the last few milliseconds.

In order to provide real-time predictions, a preferred model 104 receives additional information, including real-time credit card data, on which the model 104 can perform its execution. The preferred model 104 can receive input from any number of sources, including external sources such as other services hosting data in the same network, as illustrated in FIG. 1 (113, 114, 115).

Since the additional information comes from sources external to the preferred machine learning model 104, obtaining the data can require expensive network calls to networks inside or outside of the machine learning system. For example, a preferred machine learning model may receive additional information through a data communication network 112, e.g., local area network (LAN) or wide area network (WAN), e.g., the Internet, or a combination of networks, any of which may include wireless links.

In some implementations, the processing time of the preferred machine learning model 104 is unpredictable at least in part because the preferred model has a more complicated architecture than the fallback model. For example, the preferred model may have a deep architecture with multiple layers of operations while the fallback model has a shallow architecture with only a single layer of computations. Another example of a preferred machine learning model 104 processing that is unpredictable is a graph search that can have unpredictable processing time because response time varies based on the complexity of the existing graph and the complexity of the query to search the graph.

In some implementations, the processing time of the preferred machine learning model is unpredictable at least in part because the preferred model may take in inputs that need to be pre-processed in a way that is not required for the fallback model. For example, a machine learning system 100 may need to perform a lookup on a table of customer or merchant information and then transform an existing input and provide the results to a preferred model. As an example, a machine learning system 100 may need to perform a lookup on the current purchase in order to determine if the current purchase is above or below the average purchase for the customer, the merchant, or for this customer and this merchant. The machine learning system 100 may then provide the result of the determination as input to a preferred model.

Requirements for inputs requiring network calls, complicated computations, or deriving inputs from data may also make the processing time of the preferred model unpredictable. For example, a preferred model may run a sub model over input text. For example given a web page or other electronic document as input, the preferred model may include one submodel that extracts all the product names in the document and provides the extracted entity names as features to another submodel that predicts the likelihood of purchasing another product.

For example, as described above, in order to provide output 106, such as real-time predictions regarding whether a person's credit card transactions are fraudulent, a preferred machine learning model 104 receives the person's real-time credit transaction history for the past five minutes. The machine learning system 100 makes network calls in order to communicate with a credit transaction system and obtain this information. However, there is a possibility that this communication between the machine learning system and the credit transaction system may be delayed and that the preferred model will not receive the information necessary in time to make an accurate prediction of the nature of the person's credit card transactions. An example problem with real-time data streaming systems, such as a machine learning system that relies on real-time data streams, that may cause such processing delays is that congestion or transient destabilization events, like network communication failures, can lead to processing backlogs and long recovery times.

A fallback machine learning model 105 receives input data including a real-time processing request and performs processing in a consistent amount of time that is less than or equal to a predetermined amount of time. In some implementations, in order to maintain a reliable execution time, the fallback model 105 receives approximated additional information necessary to perform operations, i.e., rather than additional information obtained by the machine learning system in real-time in response to receiving the processing request. For example, instead of receiving a person's real-time credit card transaction history to predict whether the person's credit card transactions are fraudulent, a fallback model 105 receives an approximation of the person's credit card transaction history based on data maintained by the machine learning system and not obtained from the credit card transaction history system in real-time. The approximated data is typically a smaller table that is available locally to the fallback machine learning model, e.g., that is hosted on the same device that executes the fallback machine learning model. For example, the smaller table may include data for all credit card transactions from the past five minutes instead of all transaction from the past month. The approximation can also be based on clusters of information, i.e. the average transaction price in a city rather than for a particular merchant in that city. A fallback model 105 does not receive additional data from network calls to perform processing. Instead, a fallback machine learning model processes requests on a single machine with only request data or data previously-known to the machine learning system.

Additionally, or alternatively, a fallback machine learning model 105 can be computationally less sophisticated than a preferred machine learning model and may therefore not require as much time to process real-time requests as a preferred model.

A machine learning system may have any number of preferred machine learning models 104 and fallback models 105. However, each preferred model 104 should have a corresponding fallback model 105 to ensure that requests are processed within an acceptable latency period.

In order for a machine learning system to perform in real-time and provide a response to a given request, the system must support a hard latency limit or threshold on processing operations. The latency limit may be an acceptable period of time between when a real-time processing request is received and when the system is expected to return a response to the real-time processing request. For example, a latency limit can be 6 milliseconds, 15 milliseconds, or 30 milliseconds. The example system 100 may provide a response to a request in less time than the latency limit, but should not take more time than the time specified by the limit. In some implementations, a request specifies a latency limit for responding to the request. In other implementations, the example system 100 imposes a latency limit for how long a request should take to process in the system. The imposed latency limit can be configurable by a user of the system 100 or may be pre-determined by a system designer.

In some implementations, a machine learning modeling system determines and sets an optimal latency limit by determining how much time the system requires to recover from execution problems and sets that time as the latency limit. An example system detects overload or operation timeouts and subsamples traffic in order to determine how long the system needs to recover from transient events, clear processing backlogs, and serve requests with high fidelity. Alternatively, an example system can determine that the system requires too much time to recover from execution problems and can set a latency limit by choosing an optimal time to provide a response to a user request.

Figure 2:
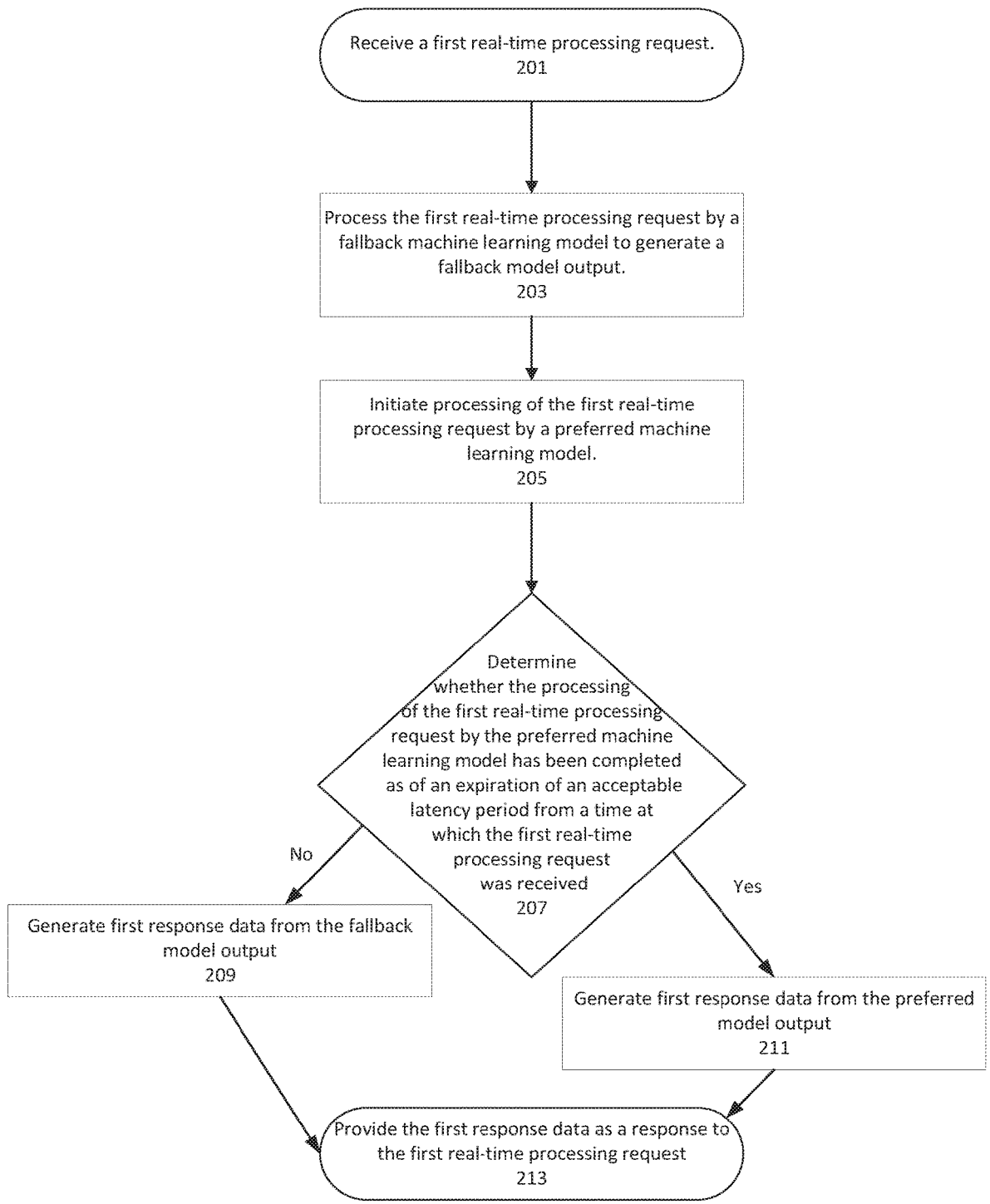
FIG. 2 is a flow diagram of an example method for providing consistent processing in a machine learning system.

FIG. 2 is a flow diagram of an example process for providing consistent processing. For convenience, the process 200 will be described as being performed by a system of one or more computers located in one or more locations. For example, a machine learning system, e.g., the machine learning system 100 of FIG. 1, appropriately programmed in accordance with this specification, can perform the process 200.

The system receives a real-time processing request (201). The system processes the request using a fallback machine learning model to generate a fallback model output (203).

In parallel, the system initiates processing of the request by a preferred machine learning model and then processes the request using the preferred model (205).

The system determines whether the request processing by the preferred machine learning model has been completed as of the expiration of an acceptable latency period (207). The latency period may be defined as the period of time from when the processing request was received to a predefined time limit. As discussed above, the acceptable limit may be configurable or predefined.

When the preferred machine learning model has not completed as of an expiration of an acceptable latency period, the system generates a response to the request from the fallback model output (209).

However, if the preferred machine model has completed prior to or by the expiration of the acceptable latency period, the system generates a response to the request from the preferred model output (211).

The system provides the generated response in response to the real-time processing request (213).

By providing a graceful degradation of processing quality when a preferred machine learning model does not execute in the allotted latency limit timeframe, a machine learning system may be able to continue to operate even when communication to a third-party is unavailable, complex processing does not complete, and/or real-time input data is missing. In these cases, a fallback machine learning model may provide a lower-quality result to a real-time request.

Figure 3:
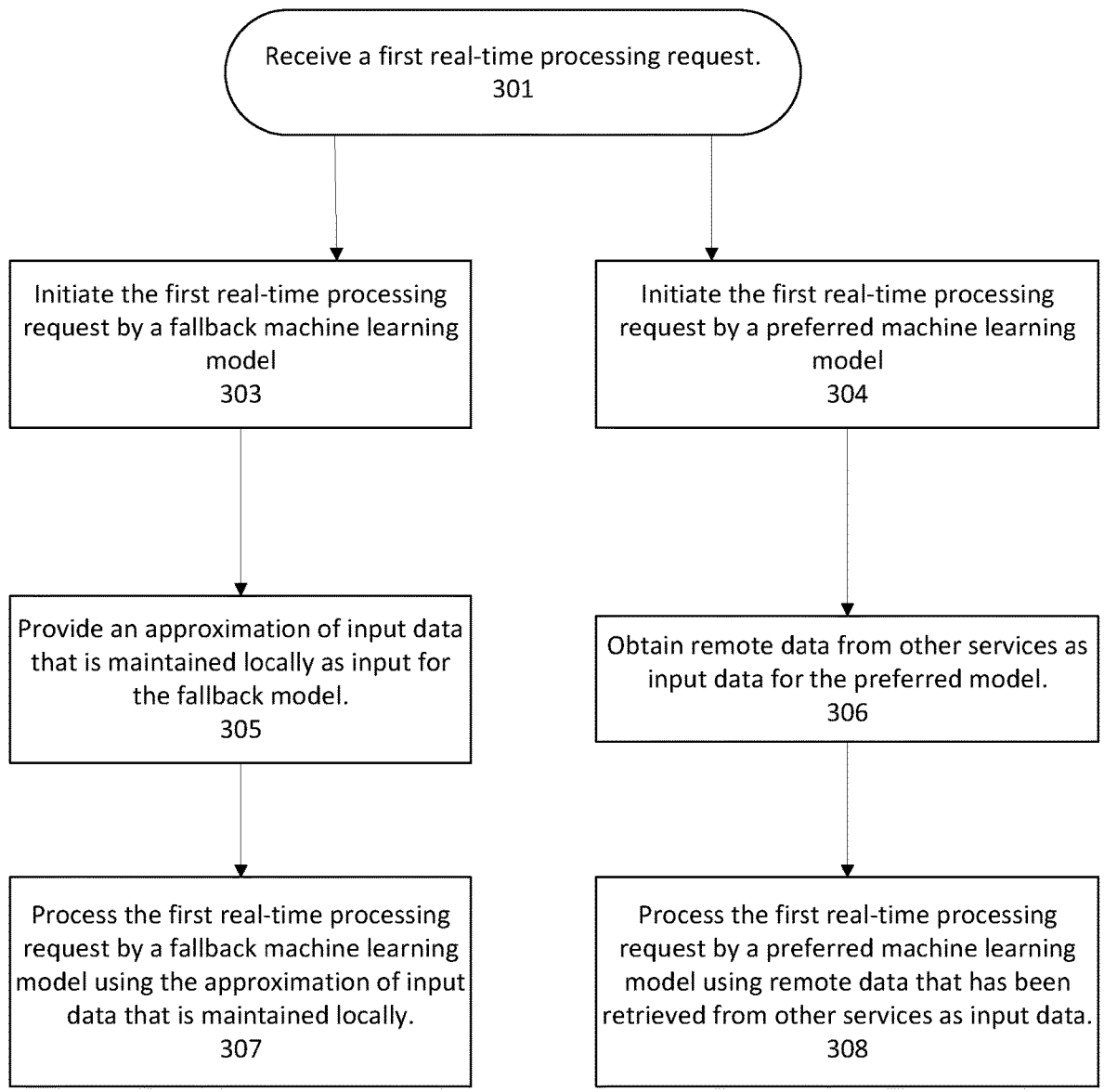
FIG. 3 is a flow diagram of an example method for initiating processing of a preferred and fallback model. Like reference numbers and designations in the various drawings indicate like elements.

FIG. 3 is a flow diagram of an example method for initiating processing of a preferred and fallback model. For convenience, the process 300 will be described as being performed by a system of one or more computers located in one or more locations. For example, a machine learning system, e.g., the machine learning system 100 of FIG. 1, appropriately programmed in accordance with this specification, can perform the process 300.

To begin, the system receives a real-time processing request (301). The system 100 initiates processing of the request by a fallback machine learning model (303) and a preferred machine learning model (304).

The system provides an approximation of input data that is maintained locally to the system as input for the fallback model (305) and the fallback model uses the approximation to process the request (307) to generate a fallback model output. That is, the system generates an input to the fallback machine learning model from data that is received with the request and data that is maintained locally, i.e., on the same device on which the fallback machine learning model is implemented.

The system also fetches remote data by making a network call to generate an input for the preferred machine learning model (306). That is, the system obtains data, e.g., real-time transaction data, by making a network call to a remote system and uses the obtained data and the data received with the request to generate an input to the preferred machine learning model. The preferred model uses this fetched data to process the request (308). Because making the network call can be slow due to network congestion or transient destabilization events, like network communication failures, the preferred machine learning's output can take longer than the fallback machine learning model. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a computer-implemented method comprising:
  receiving a first real-time processing request;
  processing the first real-time processing request by a fallback machine learning model to generate a fallback model output;
  initializing processing of the first real-time processing request by a preferred machine learning model;
  determining that the processing of the first real-time processing request by the preferred machine learning model has not been completed as of an expiration of an acceptable latency period from a time at which the first real-time processing request was received; and
  in response to determining that the processing of the first real-time processing request by the preferred machine learning model has not been completed:
    generating first response data from the fallback model output; and
    providing the first response data as a response to the first real-time processing request.

Embodiment 2 is the computer-implemented method of embodiment 1, further comprising
  receiving a second real-time processing request for a machine learning model output;
  initializing processing of the second real-time processing request by the preferred machine learning model;
  processing the second real-time processing request by the fallback machine learning model to generate a fallback model output for the second real-time processing request;
  determining that the processing of the second real-time processing request by the preferred machine learning model has completed to generate a preferred model output for the second real-time processing request prior to an expiration of the acceptable latency period from a time at which the second real-time processing request was received; and
  in response to determining that the processing of the second real-time processing request by the preferred model has completed:
    generating second response data from the preferred model output; and
    providing the second response data as a response to the second real-time processing request.

Embodiment 3 is the computer-implemented method of any embodiment 1-2, wherein processing the first real-time processing request using the preferred machine learning model comprises:
  identifying, from the first real-time processing request, additional information to be provided as input to the preferred machine learning model;
  obtaining the additional information for the first real-time processing request by making at least one network call; and
  generating a preferred model input for the preferred machine learning model from the additional information and the first real-time processing request.

Embodiment 4 is the computer-implemented method of any embodiment 2-3, wherein processing the first real-time processing request using the fallback machine learning model comprises:
  approximating the additional information for the first real-time processing request;
  generating a fallback model input from the approximation of the additional information and the first real-time processing request; and
  processing the fallback model input using the fallback machine learning model to generate the fallback output.

Embodiment 5 is the computer-implemented method of any embodiment 1-4, wherein an acceptable latency period is configurable.

Embodiment 6 is the computer-implemented method of any embodiment 1-5, wherein an acceptable latency period is predetermined prior to processing the first real-time processing request.

Embodiment 7 is the computer-implemented method of any embodiment 1-6, wherein:
  the real-time request is a request to predict a next transaction price or a next transaction price direction for one or more financial products;
  the preferred model processes the real-time request with additional information acquired about recent transaction prices; and
  the fallback model processes the real-time request with an approximation of the additional information about the recent transaction prices.

Embodiment 8 is the computer-implemented method of embodiment 7, wherein the financial products comprise one or more of common stock shares, exchange traded fund shares, options contracts, commodity futures contracts, or financial derivatives.

Embodiment 9 is the computer-implemented method of any embodiment 1-8, wherein:
  the real-time request is a request to predict whether a particular transaction is anomalous or fraudulent;
  the preferred model processes the real-time request with additional information acquired about recent transactions; and
  the fallback model processes the real-time request with an approximation of the additional information about recent transactions.

Embodiment 10 is the computer-implemented method of embodiment 9, wherein:
  the particular transaction is a completed credit card or debit card transaction and the additional information includes information regarding recent completed credit card or debit card transactions.

Embodiment 11 is the computer-implemented method of any embodiment 9-10, wherein:
  the particular transaction is a financial claims processing transaction and
  the additional information includes information regarding recent financial claims processing transactions.

Embodiment 12 is the computer-implemented method of any embodiment 9-11, wherein:
  the particular transaction is an insurance claims transaction, a healthcare claims transaction, or an employee expense claims transaction and
  the additional information includes information regarding recent claims transactions.

Embodiment 13 is the computer-implemented method of any embodiment 1-12, wherein:
  the real-time request is a request to predict security threats or anomalous behavior for one or more users or machines on a network;
  the preferred model processes the real-time request with additional information acquired about user or machine behavior; and the fallback model processes the real-time request with an approximation of the additional information about the user or machine behavior.

Embodiment 14 is a system comprising:
one or more computers; and
one or more storage devices storing instructions that are operable, when executed by the one or more computers, to cause the one or more computers to perform operations comprising:
receiving a first real-time processing request;
processing the first real-time processing request by a fallback machine learning model to generate a fallback model output;
initializing processing of the first real-time processing request by a preferred machine learning model;
determining that the processing of the first real-time processing request by the preferred machine learning model has not been completed as of an expiration of an acceptable latency period from a time at which the first real-time processing request was received; and
in response to determining that the processing of the first real-time processing request by the preferred machine learning model has not been completed:
generating first response data from the fallback model output; and
providing the first response data as a response to the first real-time processing request.

Embodiment 15 is the system of embodiment 14, wherein the operations further comprise:
receiving a second real-time processing request for a machine learning model output;
initializing processing of the second real-time processing request by the preferred machine learning model;
processing the second real-time processing request by the fallback machine learning model to generate a fallback model output for the second real-time processing request;
determining that the processing of the second real-time processing request by the preferred machine learning model has completed to generate a preferred model output for the second real-time processing request prior to an expiration of the acceptable latency period from a time at which the second real-time processing request was received; and
in response to determining that the processing of the second real-time processing request by the preferred model has completed:
generating second response data from the preferred model output; and
providing the second response data as a response to the second real-time processing request.

Embodiment 16 is the system of any embodiment 14-15, wherein processing the first real-time processing request using the preferred machine learning model comprises:
identifying, from the first real-time processing request, additional information to be provided as input to the preferred machine learning model;
obtaining the additional information for the first real-time processing request by making at least one network call; and
generating a preferred model input for the preferred machine learning model from the additional information and the first real-time processing request.

Embodiment 17 is the system of any embodiment 15-16, wherein processing the first real-time processing request using the fallback machine learning model comprises:
approximating the additional information for the first real-time processing request;
generating a fallback model input from the approximation of the additional information and the first real-time processing request; and
processing the fallback model input using the fallback machine learning model to generate the fallback output.

Embodiment 18 is the system of any embodiment 14-17, wherein an acceptable latency period is configurable.

Embodiment 19 is the system of any embodiment 14-18, wherein an acceptable latency period is predetermined prior to processing the first real-time processing request.

Embodiment 20 is the system of any embodiment 14-19, wherein:
the real-time request is a request to predict a next transaction price or a next transaction price direction for one or more financial products;
the preferred model processes the real-time request with additional information acquired about recent transaction prices; and
the fallback model processes the real-time request with an approximation of the additional information about the recent transaction prices.

Embodiment 21 is the system of embodiment 20, wherein the financial products comprise one or more of common stock shares, exchange traded fund shares, options contracts, commodity futures contracts, or financial derivatives.

Embodiment 22 is the system of any embodiment 14-21, wherein:
the real-time request is a request to predict whether a particular transaction is anomalous or fraudulent;
the preferred model processes the real-time request with additional information acquired about recent transactions; and
the fallback model processes the real-time request with an approximation of the additional information about recent transactions.

Embodiment 23 is the system of embodiment 22, wherein:
the particular transaction is a completed credit card or debit card transaction and the additional information includes information regarding recent completed credit card or debit card transactions.

Embodiment 24 is the system of any embodiment 22-23, wherein:
the particular transaction is a financial claims processing transaction and
the additional information includes information regarding recent financial claims processing transactions.

Embodiment 25 is the system of any embodiment 22-24, wherein:
the particular transaction is an insurance claims transaction, a healthcare claims transaction, or an employee expense claims transaction and
the additional information includes information regarding recent claims transactions.

Embodiment 26 is the system of any embodiment 14-25, wherein:
the real-time request is a request to predict security threats or anomalous behavior for one or more users or machines on a network;
the preferred model processes the real-time request with additional information acquired about user or machine behavior; and
the fallback model processes the real-time request with an approximation of the additional information about the user or machine behavior.

Embodiment 27 is the one or more non-transitory computer-readable storage mediums comprising instructions stored thereon that are executable by a processing device and upon such execution cause the processing device to perform operations comprising:
- receiving a first real-time processing request;
- processing the first real-time processing request by a fallback machine learning model to generate a fallback model output;
- initializing processing of the first real-time processing request by a preferred machine learning model;
- determining that the processing of the first real-time processing request by the preferred machine learning model has not been completed as of an expiration of an acceptable latency period from a time at which the first real-time processing request was received; and
- in response to determining that the processing of the first real-time processing request by the preferred machine learning model has not been completed:
  - generating first response data from the fallback model output; and
  - providing the first response data as a response to the first real-time processing request.

Embodiment 28 is the one or more non-transitory computer-readable storage mediums of embodiment 27, further comprising
- receiving a second real-time processing request for a machine learning model output;
- initializing processing of the second real-time processing request by the preferred machine learning model;
- processing the second real-time processing request by the fallback machine learning model to generate a fallback model output for the second real-time processing request;
- determining that the processing of the second real-time processing request by the preferred machine learning model has completed to generate a preferred model output for the second real-time processing request prior to an expiration of the acceptable latency period from a time at which the second real-time processing request was received; and
- in response to determining that the processing of the second real-time processing request by the preferred model has completed:
  - generating second response data from the preferred model output; and
  - providing the second response data as a response to the second real-time processing request.

Embodiment 29 is the one or more non-transitory computer-readable storage mediums of any embodiment 27-28, wherein processing the first real-time processing request using the preferred machine learning model comprises:
- identifying, from the first real-time processing request, additional information to be provided as input to the preferred machine learning model;
- obtaining the additional information for the first real-time processing request by making at least one network call; and
- generating a preferred model input for the preferred machine learning model from the additional information and the first real-time processing request.

Embodiment 30 is the one or more non-transitory computer-readable storage mediums of any embodiment 28-29, wherein processing the first real-time processing request using the fallback machine learning model comprises:
- approximating the additional information for the first real-time processing request;
- generating a fallback model input from the approximation of the additional information and the first real-time processing request; and
- processing the fallback model input using the fallback machine learning model to generate the fallback output.

Embodiment 31 is the one or more non-transitory computer-readable storage mediums of any embodiment 27-30, wherein an acceptable latency period is configurable.

Embodiment 32 is the one or more non-transitory computer-readable storage mediums of any embodiment 27-31, wherein an acceptable latency period is predetermined prior to processing the first real-time processing request.

Embodiment 33 is the one or more non-transitory computer-readable storage mediums of any embodiment 27-32, wherein:
- the real-time request is a request to predict a next transaction price or a next transaction price direction for one or more financial products;
- the preferred model processes the real-time request with additional information acquired about recent transaction prices; and
- the fallback model processes the real-time request with an approximation of the additional information about the recent transaction prices.

Embodiment 34 is the one or more non-transitory computer-readable storage mediums of embodiment 33, wherein the financial products comprise one or more of common stock shares, exchange traded fund shares, options contracts, commodity futures contracts, or financial derivatives.

Embodiment 35 is the one or more non-transitory computer-readable storage mediums of any embodiment 27-34, wherein:
- the real-time request is a request to predict whether a particular transaction is anomalous or fraudulent;
- the preferred model processes the real-time request with additional information acquired about recent transactions; and
- the fallback model processes the real-time request with an approximation of the additional information about recent transactions.

Embodiment 36 is the one or more non-transitory computer-readable storage mediums of embodiment 35, wherein:
- the particular transaction is a completed credit card or debit card transaction and the additional information includes information regarding recent completed credit card or debit card transactions.

Embodiment 37 is the one or more non-transitory computer-readable storage mediums of any embodiment 35-36, wherein:
- the particular transaction is a financial claims processing transaction and
- the additional information includes information regarding recent financial claims processing transactions.

Embodiment 38 is the one or more non-transitory computer-readable storage mediums of any embodiment 35-37, wherein:
- the particular transaction is an insurance claims transaction, a healthcare claims transaction, or an employee expense claims transaction and
- the additional information includes information regarding recent claims transactions.

Embodiment 39 is the one or more non-transitory computer-readable storage mediums of any embodiment 27-38, wherein:

the real-time request is a request to predict security threats or anomalous behavior for one or more users or machines on a network;
the preferred model processes the real-time request with additional information acquired about user or machine behavior; and
the fallback model processes the real-time request with an approximation of the additional information about the user or machine behavior.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a first real-time processing request for first response data to be provided within an acceptable latency period beginning when the first real-time processing request is received at a machine learning system, the machine learning system comprising local memory that is local to the machine learning system, a fallback machine learning model, and a preferred machine learning model, wherein the fallback machine learning model and the preferred machine learning model are trained to perform a same particular machine learning task;
processing, by the machine learning system, the first real-time processing request by using the preferred machine learning model to generate a preferred model output and by using the fallback machine learning model in parallel to generate a fallback model output;
wherein processing by using the preferred machine learning model comprises:
executing a remote call to obtain additional information stored at least in part on memory remotely located from the machine learning system, and
processing, as input to the preferred machine learning model, the first real-time processing request and the additional information obtained by the remote call, to generate the preferred model output;
wherein processing by using the fallback machine learning model comprises:
processing, as input to the fallback machine learning model, the first real-time processing request and approximated information, to generate the fallback model output within the acceptable latency period, wherein the approximated information is stored in the local memory and comprises an approximation of the additional information, and wherein the fallback machine learning model processes the first real-time processing request using only request data in the first real-time processing request or data previously known to and locally stored in the machine learning system;
determining, by the machine learning system, within the acceptable latency period, whether the processing of the first real-time processing request by the preferred machine learning model has completed to generate the preferred model output, and, if so,
generating the first response data from the preferred model output, and if not, generating the first response data from the fallback model output; and
providing the first response data as a response to the first real-time processing request.

2. The computer-implemented method of claim 1, wherein the acceptable latency period is configurable.

3. The computer-implemented method of claim 1, wherein the acceptable latency period is predetermined prior to processing the first real-time processing request.

4. The computer-implemented method of claim 1,
wherein the first real-time processing request is a request to predict a next transaction price or a next transaction price direction for one or more financial products, and
wherein the additional information comprises information about transaction prices in a last few milliseconds.

5. The computer-implemented method of claim 4, wherein the financial products comprise one or more of common stock shares, exchange traded fund shares, options contracts, commodity futures contracts, or financial derivatives.

6. The computer-implemented method of claim 1,
wherein the first real-time processing request is a request to predict whether a particular transaction is anomalous or fraudulent, and
wherein the additional information comprises information about transactions.

7. The computer-implemented method of claim 6, wherein:
the particular transaction is a completed credit card or debit card transaction, and the additional information includes information regarding credit card or debit card transactions completed in a last few minutes.

8. The computer-implemented method of claim 6, wherein:
the particular transaction is a financial claims processing transaction, and
the additional information includes information regarding financial claims processing transactions.

9. The computer-implemented method of claim 6, wherein:
the particular transaction is an insurance claims transaction, a healthcare claims transaction, or an employee expense claims transaction, and
the additional information includes information regarding claims transactions.

10. The computer-implemented method of claim 1, wherein the first real-time processing request is a request to predict security threats or anomalous behavior for one or more users or machines on a network, and
wherein the additional information comprises information about user or machine behavior.

11. A system comprising:
one or more computers; and
one or more memory devices including local memory that is local to the one or more computers, wherein the one or more memory devices store instructions that are operable, when executed by the one or more computers, to cause the one or more computers, performing as a machine learning system, to perform operations comprising:
receiving a first real-time processing request for first response data to be provided within an acceptable latency period beginning when the first real-time processing request is received at the machine learning system, the machine learning system comprising the local memory, a fallback machine learning model, and a preferred machine learning model, wherein the fallback machine learning model and the preferred machine learning model are trained to perform a same particular machine learning task;
processing, by the machine learning system, the first real-time processing request by using the preferred machine learning model to generate a preferred model output and by using the fallback machine learning model in parallel to generate a fallback model output;
wherein processing by using the preferred machine learning model comprises;
executing a remote call to obtain additional information stored at least in part on memory remotely located from the machine learning system, and
processing, as input to the preferred machine learning model, the first real-time processing request and the additional information obtained by the remote call to generate the preferred model output;
wherein processing by using the fallback machine learning model comprises:
processing, as input to the fallback machine learning model, the first real-time processing request and approximated information to generate flail the fallback model output within the acceptable latency period, wherein the approximated information is stored in the local memory and comprises an approximation of the additional information, and wherein the fallback machine learning model processes the first real-time processing request using only request data in the first real-time processing request or data previously known to and locally stored in the machine learning system;
determining, by the machine learning system, within the acceptable latency period, whether the processing of the first real-time processing request by the preferred machine learning model has completed to generate the preferred model output and, if so, generating the first response data from the preferred model output, and if not, generating the first response data from the fallback model output; and
providing the first response data as a response to the first real-time processing request.

12. The system of claim 11, wherein the acceptable latency period is configurable.

13. The system of claim 11, wherein the acceptable latency period is predetermined prior to processing the first real-time processing request.

14. One or more non-transitory computer-readable storage mediums comprising instructions stored thereon that are executable by a processing device and upon such execution cause the processing device to perform machine learning system operations comprising:
receiving a first real-time processing request for first response data to be provided within an acceptable latency period beginning when the first real-time processing request is received at a machine learning system, the machine learning system comprising local memory that is local to the machine learning system, a fallback machine learning model and a preferred machine learning model wherein the fallback machine learning model and the preferred machine learning model are trained to perform a same particular machine learning task;
processing, by the machine learning system, the first real-time processing request by using the preferred machine learning model to generate a preferred model output and by using the fallback machine learning model in parallel to generate a fallback model output;
wherein processing by using the preferred machine learning model comprises:
executing a remote call to obtain additional information stored at least in part on memory remotely located from the machine learning system, and
processing, as input to the preferred machine learning model, the first real-time processing request and the additional information obtained by the remote call to generate the preferred model output;
wherein processing by using the fallback machine learning model comprises:
processing, as input to the fallback machine learning model, the first real-time processing request and approximated information to generate the fallback model output within the acceptable latency period, wherein the approximated information is stored in the local memory and comprises an approximation of the additional information, and wherein the fallback machine learning model processes the first real-time processing request using only request data in the first real-time processing request or data previously known to and locally stored in the machine learning system;
determining, by the machine learning system, within the acceptable latency period, whether the processing of the first real-time processing request by the preferred machine learning model has completed to generate the preferred model output, and, if so,
generating the first response data from the preferred model output, and if not, generating the first response data from the fallback model output; and
providing the first response data as a response to the first real-time processing request.

* * * * *

UNITED STATES PATENT AND TRADEMARK OFFICE
CERTIFICATE OF CORRECTION

PATENT NO. : 11,004,010 B2
APPLICATION NO. : 15/395630
DATED : May 11, 2021
INVENTOR(S) : Dustin Lundring Rigg Hillard et al.

Page 1 of 1

It is certified that error appears in the above-identified patent and that said Letters Patent is hereby corrected as shown below:

In the Claims

Column 19, Line 52, in Claim 11 after "generate" delete "flail".

Signed and Sealed this
Twentieth Day of July, 2021

Drew Hirshfeld
*Performing the Functions and Duties of the
Under Secretary of Commerce for Intellectual Property and
Director of the United States Patent and Trademark Office*